United States Patent
Hirosawa

Patent Number: 5,249,067
Date of Patent: Sep. 28, 1993

[54] METHOD OF AND APPARATUS FOR PRODUCING HALFTONE DOT IMAGE

[75] Inventor: Makoto Hirosawa, Kyoto, Japan

[73] Assignee: Dainippon Screen Mfg. Co., Ltd., Kyoto, Japan

[21] Appl. No.: 722,415

[22] Filed: Jun. 27, 1991

[30] Foreign Application Priority Data

Jun. 28, 1990 [JP] Japan .................................. 2-171299
Jun. 5, 1991 [JP] Japan .................................. 3-162153

[51] Int. Cl.$^5$ .............................................. H04N 1/40
[52] U.S. Cl. .................................. 358/456; 358/298; 358/452; 358/462
[58] Field of Search .............................. 358/456–460, 358/429, 298, 462

[56] References Cited

U.S. PATENT DOCUMENTS 4,727,430  2/1988  Miwa ..................................... 358/298
4,866,533  9/1989  Nagashima ........................... 358/298
4,972,500  11/1990  Ishii et al. ............................ 358/458

Primary Examiner—Edward L. Coles, Sr.
Assistant Examiner—Kimberly A. Williams
Attorney, Agent, or Firm—Lowe, Price, LeBlanc & Becker

[57] ABSTRACT

A halftone image is formed from a contone image with one of a hardware dot generator and a software dot generator. Halftone dots in simpler shapes used in usual reproduction or printing are formed with the hardware dot generator; thus high-speed dot generation is accomplished. Halftone dots in special shapes or of special conditions are formed with the software dot generator; thus flexible dot generation is accomplished. A dot shape, a screen ruling, and a screen angle are input as halftone dot information. When the halftone dot information corresponds to a basic pattern stored in a screen pattern memory in the hardware dot generator, the hardware dot generator is activated to produce binary halftone-dot image data. When the halftone dot information corresponds to a basic pattern stored in a memory in the software dot generator, the software dot generator is activated to produce binary halftone-dot image data according to a dot generation program.

15 Claims, 6 Drawing Sheets

METHOD OF AND APPARATUS FOR PRODUCING HALFTONE DOT IMAGE

BACKGROUND OF THE INVENTION

1. Field of the Invention

The present invention relates to a method and an apparatus for producing binary image data of a halftone dot image from multi-digital image data of a contone image (or a continuous tone image).

2. Description of the Prior Art

In color printing process, direct scanners having a dot generator are widely used for electronically performing dot generation operation, by which contone image are converted into halftone dot images. Dot generator includes a hardware type and a software type.

A hardware dot generator includes a specific electronic circuit with a comparator and a screen pattern memory. The screen pattern memory stores a basic pattern or patterns having threshold level data. The hardware dot generator compares a multi-digital image signal with the basic pattern or patterns with the comparator thereof and forms halftone dots corresponding to the level of the image signal.

Although the hardware dot generator has an advantage of high speed processing, it lacks versatility to form halftone dots for special conditions other than standard halftone dots. For example, the hardware dot generator cannot form halftone dots having rather complicated shapes.

SUMMARY OF THE INVENTION

An object of the present invention is to provide a dot generating apparatus and a dot generating method which will have a flexibility to form special halftone dots for a special condition and ordinary halftone dots at relatively high speed.

The present invention is directed to a method of and an apparatus for forming a halftone image from a contone image, the apparatus comprises:

multi-digital image data supplying means for supplying multi-digital image data representing the contone image;

hardware dot generating means having an electronic circuit including a comparator and a first pattern memory for producing binary image data in response to a level of the multi-digital image data, the first pattern memory storing first basic pattern data consisting of a plurality of threshold levels, the hardware dot generating means performing the producing by comparing the first basic pattern data with the multi-digital image data with the comparator for each pixel;

software dot generating means having an electronic circuit including a second pattern memory, a program memory and a processor, for producing binary image data in response to a level of the multi-digital image data, the second pattern memory storing second basic pattern data consisting of function data, the program memory storing program for calculating binary image data on the basis of multi-digital image data and the function data, the processor executing the program to produce binary image data according to the program; and selection means for selecting one of the hardware dot generating means and the software dot generating means, and activating the selected means.

Preferably, the first pattern memory is a read only memory, and the second pattern memory is a random access memory.

The apparatus comprises data input means for inputting a halftone-dot type data indicating a type of halftone dots; and the selection means comprising: judging means for judging whether the halftone-dot type data corresponds to the first basic pattern data or the second basic pattern data; and selective activation means for activating the hardware dot generating means when the halftone-dot type data corresponds to the first basic pattern data and activating the software dot generating means when the halftone-dot type data corresponds to the second basic pattern data.

In addition, the first and second pattern memories store plural sets of first pattern data and plural sets of second pattern data, respectively; and one of the hardware and software dot generating means activated by the selective activation means performs the producing binary image data on the basis of a designated pattern data in the first and second pattern memories designated by the halftone-dot type data.

The apparatus further comprises: image region specifying means for specifying plural image regions in the contone image; and wherein the selective activation means activates one of the hardware and software dot generating means for each of the plural image regions according to the halftone-dot type data assigned to each of the plural image regions.

Moreover, the apparatus comprises: image editing means for editing the contone image including a character, a graphic, and a picture element, producing the multi-digital image data representing the contone image, and supplying the multi-digital image data to the multi-digital image data supplying means to be stored therein; and recording means for recording a halftone dot image on the basis of the binary image data generated by one of the hardware dot generating means and the software dot generating means.

The multi-digital image data includes a page description language expressing locations, directions, and sizes of the character, graphic, and picture element in the contone image.

The multi-digital image data supplying means further includes a multi-digital frame memory.

These and other objects, features, aspects and advantages of the present invention will become more apparent from the following detailed description of the present invention when taken in conjunction with the accompanying drawings.

DETAILED DESCRIPTION OF THE INVENTION

Figure 1:
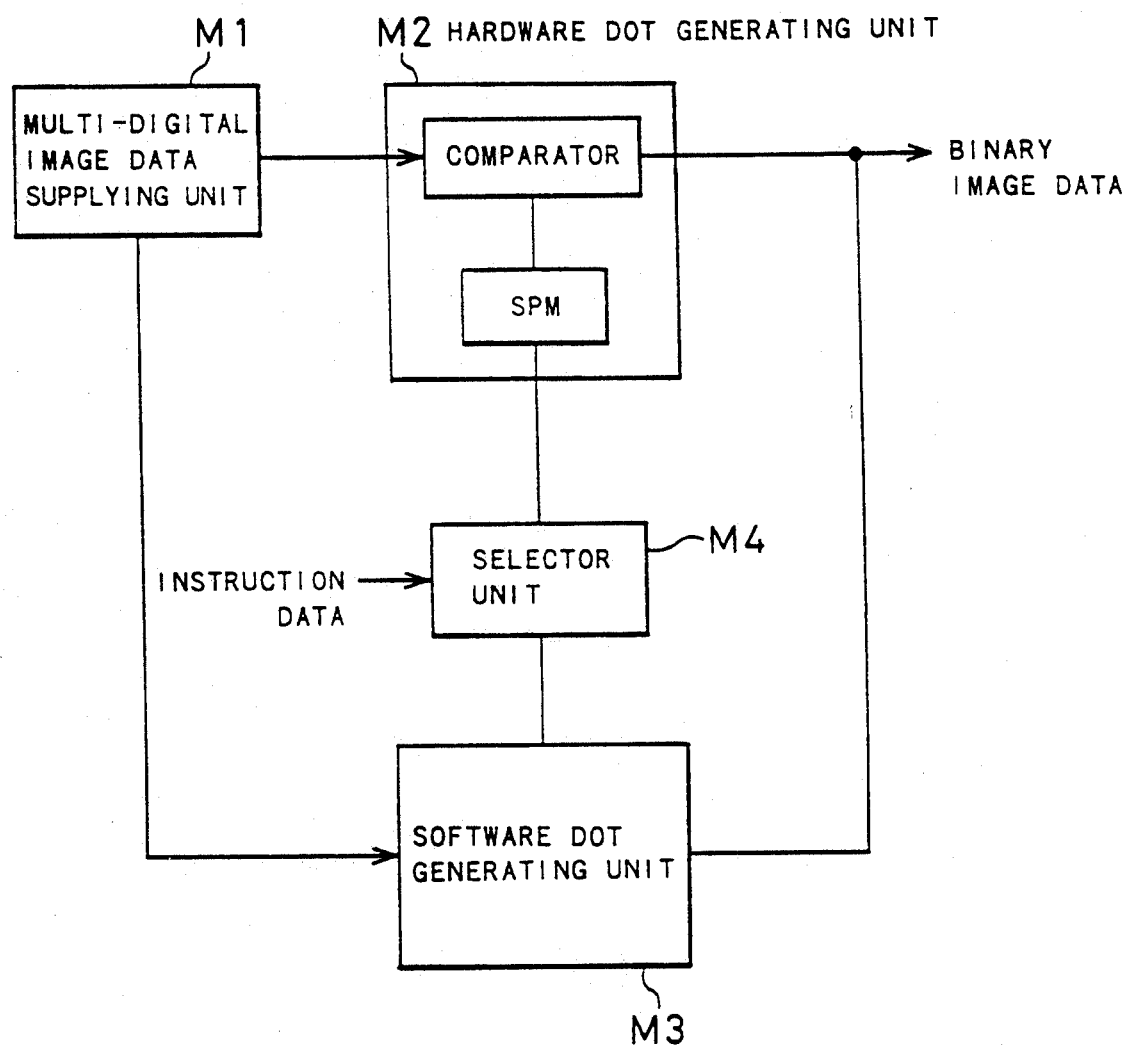
FIG. 1 is a block diagram illustrating the basic structure of an apparatus according to the present invention.

FIG. 1 is a block diagram schematically showing the structure of an image processing apparatus according to the present invention.

The image processing apparatus includes a multi-digital image data supplying unit M1, a hardware dot generating unit M2, a software dot generating unit M3, and a selector unit M4.

The multi-digital image data supplying unit M1 stores multi-digital image data representing a contone image.

The hardware dot generating unit M2 is composed of specific electronic circuits with a comparator and a pattern memory, in which a first basic pattern or patterns for dot formation are previously stored. The comparator of the hardware dot generating unit M2 compares the multi-digital image data with the first basic pattern or patterns and generates binary halftone-dot image data according to the level of the multi-digital image data.

The software dot generating unit M3 includes a processor for processing multi-digital image data according to predetermined procedure and a memory for storing a program for generating a second basic pattern or patterns for dot formation. The software dot generating unit M3 compares the multi-digital image data with the second basic pattern or patterns and generates binary halftone-dot image data according to the level of the multi-digital image data.

The selector unit M4 alternatively selects and activates one of the hardware dot generating unit M2 and the software dot generating unit M3.

In this image processing apparatus, multi-digital image data representing a contone image, stored in the multi-digital image data supplying unit M1, is converted into binary halftone-dot image data. The data conversion is performed by one of the hardware dot generating unit M2 and the software dot generating unit M3 alternatively selected by the selector unit M4.

Figure 2:
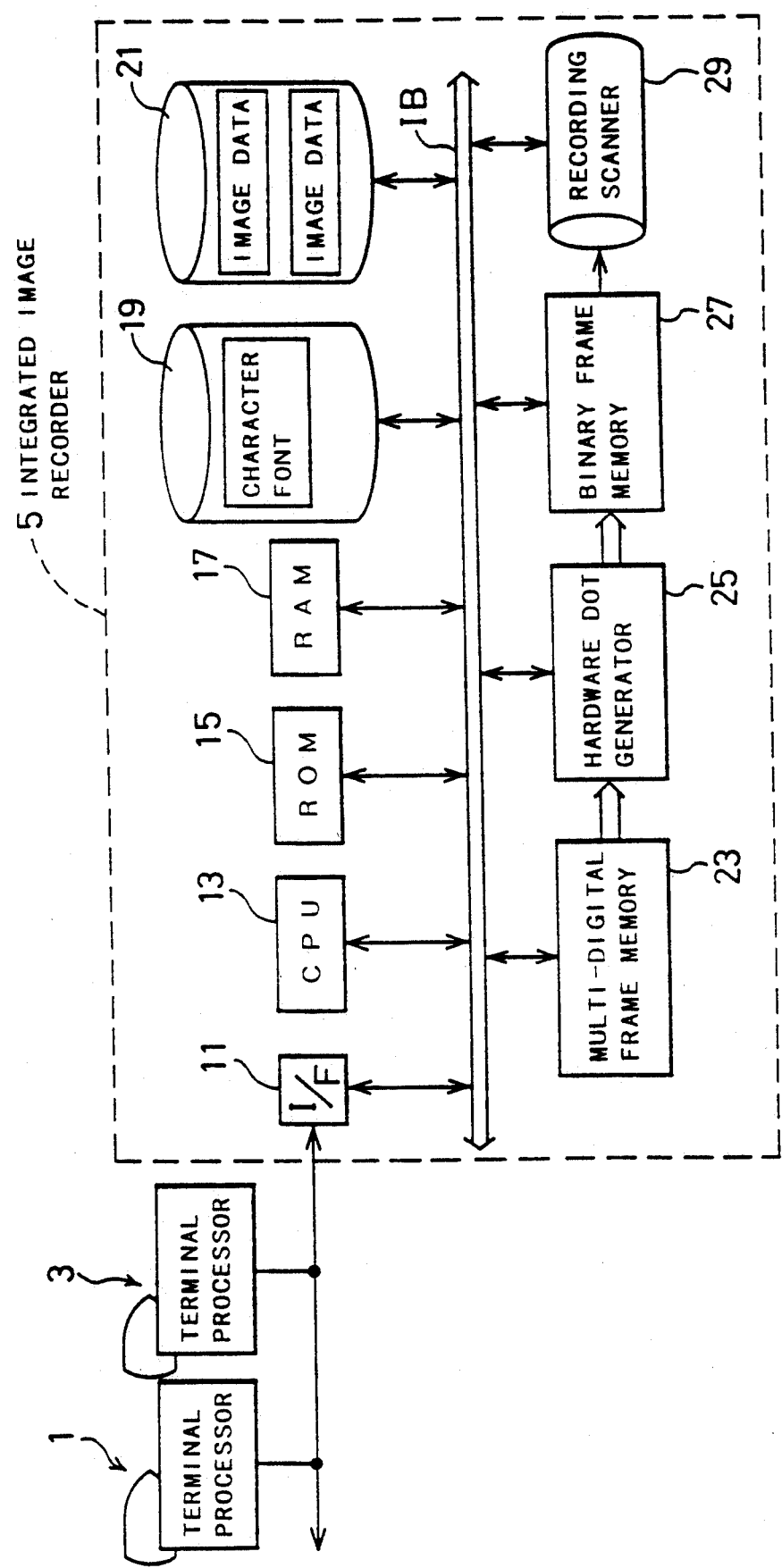
FIG. 2 is a block diagram illustrating an image editing system including a halftone dot image generating apparatus embodying the present invention.

FIG. 2 is a block diagram illustrating an image editing system including a halftone image generating apparatus embodying the present invention.

The image editing system includes terminal processors 1 and 3 and an integrated image recorder 5, which are connected to one another through a local area network (LAN).

Each of the terminal processors 1 and 3 is a microcomputer or a work station. The terminal processor 1 or 3 outputs image data representing a picture image as well as a PDL program written in a page description language, which represents a page of an integrated image including characters, graphics, and picture elements edited by an operator. The page description language is generally abbreviated as PDL, and is available with the name of 'Postscript', 'Interpress', or 'DDL'.

The integrated image recorder 5 receives the PDL program and image data of a picture element output from the terminal processor 1 or 3 and generates an integrated image. The integrated image recorder 5 includes: a front end interface 11 for transmitting data into and from the terminal processors 1 and 3; a CPU 13 for executing various application programs; a ROM 15 for storing the application programs and initial data required for the processing by the CPU 13; a RAM 17, which various data are temporarily written in and read from for the processing by the CPU 13; a first magnetic disk unit 19 for storing preset character fonts; and a second magnetic disk unit 21 for storing the image data.

The integrated image recorder 5 further includes: a multi-digital frame memory 23 for temporarily storing multi-digital image data; a hardware dot generator 25 for converting the multi-digital image data into binary image data representing a halftone dot image; a binary frame memory 27 for storing the binary image data; and an output scanner 29 for recording the halftone dot image according to the binary image data onto a film or the like. All the constituents above are interconnected through an internal bus IB.

In place of the binary frame memory 27, Another memory can be installed in which compressed image data of the binary image data, such as run-length data, are stored.

The integrated image recorder 5 receives the PDL program and image data of a picture element supplied from the terminal processor 1 or 3 and temporarily stores the image data in the second magnetic disk unit 21. The image recorder 5 then generates respective images of characters, graphics, and picture elements based on the PDL program and the image data, and develop the images thus generated into raster data, respectively, in the multi-digital frame memory 23. In detail, the image recorder 5 compares part of the PDL program expressing a character with the character fonts stored in the first magnetic disk unit 19 and generates an image representing the outline of the character; generates a graphic image based on another part of the PDL program expressing the graphic; and generates an image of a picture element based on still another part the PDL program expressing the picture element and on image data read out from the second magnetic disk unit 21. The images thus generated are developed into raster data in the multi-digital frame memory 23.

The raster data (hereinafter referred to as multi-digital image data) can be then converted into binary image data of a halftone dot image by the hardware dot generator 25, which is composed of specific electronic circuits. The binary image data is stored in the binary frame memory 27. The binary image data is then supplied from the output scanner 29 to form the halftone dot image on the film.

The data conversion from multi-digital image data to binary image data can be also executed by the CPU 13 according to a predetermined program stored in ROM 15.

The structure of the hardware dot generator 25 and the dot generating procedure executed by the CPU 13 are explained below in detail.

Figure 3:
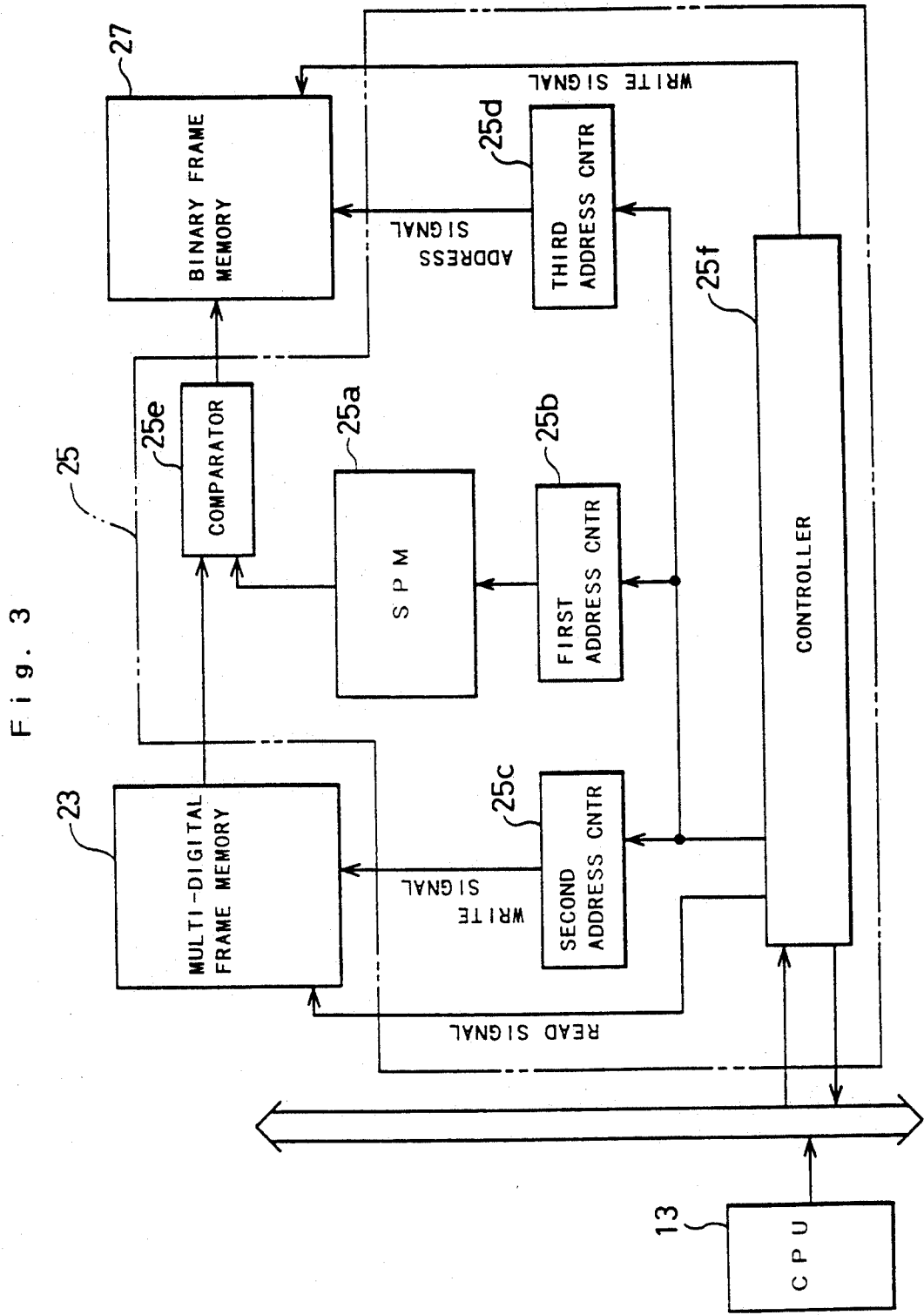
FIG. 3 is a block diagram illustrating the structure of the hardware dot generator of FIG. 2.

The hardware dot generator 25, as shown in FIG. 3, includes a screen pattern memory (or SPM) 25a for storing basic pattern data required for dot formation, first address counter 25b for specifying an address in the SPM 25a, a second address counter 25c for specifying an address in the multi-digital frame memory 23, and a third address counter 25d for specifying an address in the binary frame memory 27. The hardware dot generator 25 further includes a comparator 25e for comparing image data supplied from the multi-digital frame memory 23 with the basic pattern data supplied from the SPM 25a; and a controller 25f for outputting control signals to the address counters 25b, 25c, and 25d, the multi-digital frame memory 23, and the binary frame memory 27. The SPM 25a is a ROM. The SPM 25a stores plural sets of the basic pattern data representing plural halftone-dot patterns which have relatively simple shapes and which are frequently used in ordinary image reproduction or printing: such as square dots, chain dots, round dots, and brick dots.

The hardware dot generator 25 operates as follows: On receiving a start-up signal and image region data, which defines an image region subjected to the dot formation, from the CPU 13, the controller 25f supplies the image region data to the second address counter 25c and also supplies a read signal instructing data-output operation to the multi-digital frame memory 23. The second address counter 25c outputs an address signal specifying an address in the multi-digital frame memory 23. The multi-digital frame memory 23 receives the address signal and the read signal and then supplies image data specified by the address signal to the comparator 25e.

While supplying the image region data to the second address counter 25c, the controller 25f also supplies the image region data to the first and the third address counters 25b and 25d. The first address counter 25b outputs an address signal specifying an address in the SPM 25a. The SPM 25a receives the address signal and then outputs a value of the basic pattern data specified by the address to the comparator 25e.

Each value of the basic pattern data stored in the SPM 25a includes a plurality of threshold levels with respect to a pixel and is to be compared with the multi-digital image data. The basic pattern data is defined, for example, in a square region whose side has a length of tens of pixels. The basic pattern data is repeatedly assigned to an image plane such that the square regions are arranged to cover all over the image. In other words, a synchronized threshold level pattern is assigned on one image plane. While taking into consideration of the repetitional assignment of the basic pattern data, the address signal for the SPM 25a is made to correspond to the address signal for the multi-digital frame memory 23.

The comparator 25e compares the image data supplied from the multi-digital frame memory 23 with basic pattern data supplied from the SPM 25a. When the level of the image data is no less than the level of the basic pattern data, the comparator 25e supplies binary data having a value of "1" to the binary frame memory 27 at the address specified by the address signal from the first address counter 25b. On the other hand, when the level of the image data is less than the level of the basic pattern data, binary data having a value of '0' is given to the binary frame memory 27. Consequently, binary image data representing an image consisting of halftone dots in such a size responsive to the level of the multi-digital image data, is stored in the binary frame memory 27.

Figure 4:
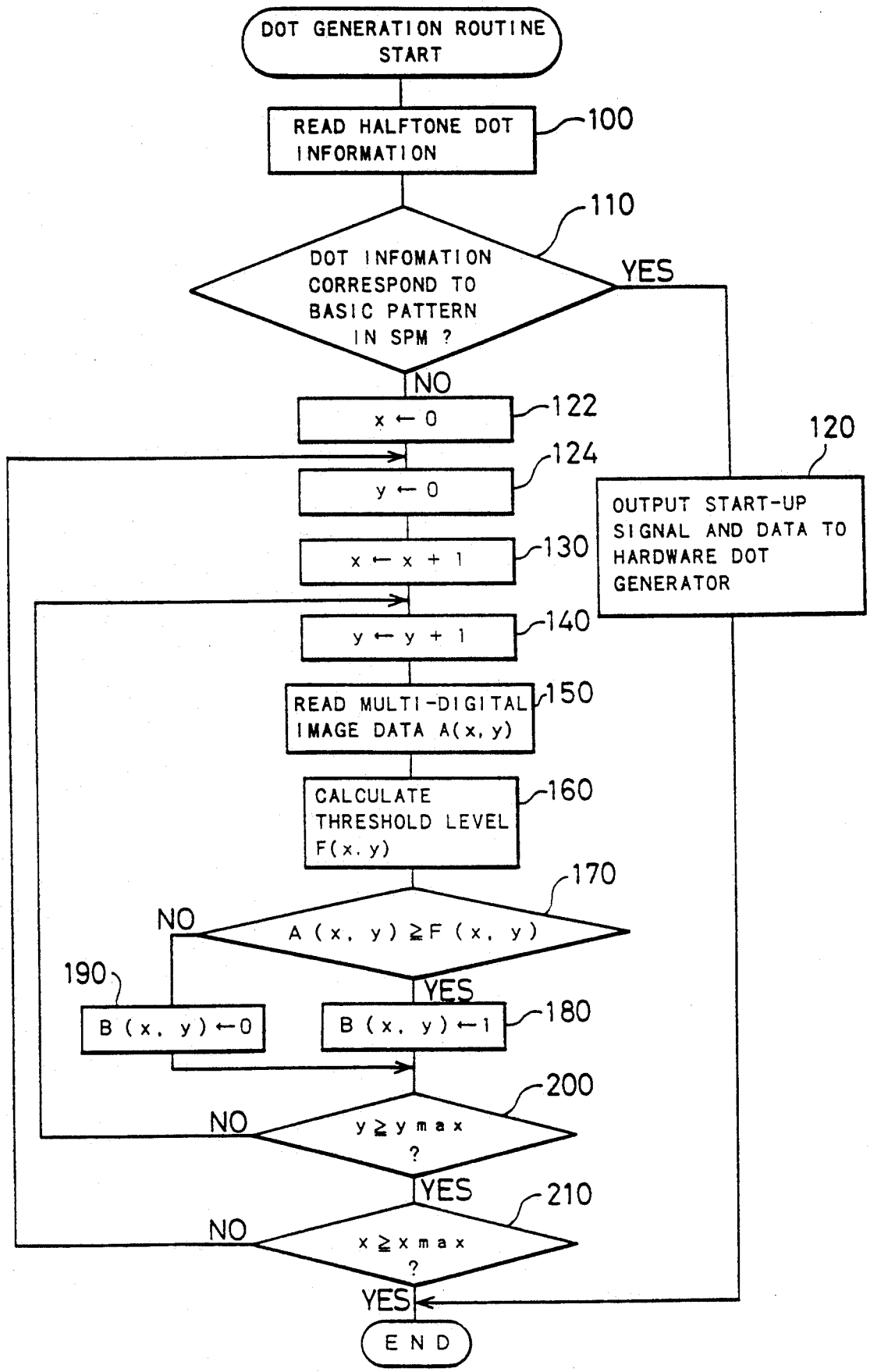
FIG. 4 is a flowchart of dot generation executed by the CPU of FIG. 2.

The dot generating process by the CPU 13 is explained along with the flowchart of FIG. 4. A program of the flowchart stores in ROM 15.

At step 100, the CPU 13 reads halftone dot information specifying a dot shape expressed in a dot shape code, a screen ruling, and a screen angle, each of which can be selected by an operator with an operation panel or a mouse. Selectable halftone dots include square dots, round dots, chain dots, brick dots, triangle dots, honeycomb dots, grain dots, and concentric circular dots.

The CPU 13 may receive the halftone dot information from the RAM 17 at step 100 when it is previously included in the PDL program, which is supplied from the terminal processors 1 and 3 and stored in the RAM 17. The dot shape is expressed in a functional data in the PDL program. Alternatively, an operator can directly input the halftone dot information as functional equations or numerals with a keyboard (not shown).

At step 110, it is judged whether a halftone dot specified by the halftone dot information is equal to that of the basic pattern data in the SPM 25a of the hardware dot generator 25. The RAM 17 stores a table of flags showing whether or not the basic pattern data corresponding to each dot shape code is stored in the SPM 25a. The CPU 13 compares the dot shape code obtained at step 100 with the table of flags for the judgment.

When a halftone dot specified by the halftone dot information corresponds to one of the basic pattern data in the SPM 25a, the procedure proceeds to step 120, at which the CPU 13 outputs a start-up signal and image region data, which defines an image region subjected to the dot formation to the hardware dot generator 25. The image region data defines an address region in the multi-digital frame memory 23 and in the SPM 25a. The CPU 13 also outputs a signal to indicate one of the plural sets of the basic pattern data in the SPM 25a. The hardware dot generator 25 is accordingly activated and converts the multi-digital image data into binary image data according to the selected basic pattern data. The binary image data thus obtained is stored in the binary frame memory 27. Then the procedure is completed.

On the other hand, when the halftone dot specified by the halftone dot information does not corresponds to one of the the basic pattern data in the SPM 25a at step 110, the procedure proceeds to step 122, at which a variable x is set at zero. The variable x represents a coordinate (or an address) in a subscanning direction of multi-digital image data developed as raster data. At the next step 124, a variable y is set at zero. The variable y represents a coordinate in a main scanning direction of multi-digital image data.

The variable x is increased by one at step 130, and the variable y is increased by one at step 140.

At step 150, the CPU 13 reads out multi-digital image data A(x,y) stored at an address defined by the values of x and y in the multi-digital frame memory 23.

At step 160, a threshold level F(x,y) used for the dot formation is calculated from a functional equation specified by the dot shape code which is input at step 100. The RAM 17 stores in advance a table of functional equations each of which represents a shape of a halftone dot. The CPU 13 searches for one of the functional equations that corresponds to the dot shape code, and calculates the threshold level F(x,y) from the functional equation. The threshold level F(x,y) corresponds to the function data in the present invention. In general, the function data is a set of values of a functional equation which is designated by the dot shape code and whose value depends on the position in an image plane.

Figure 5:
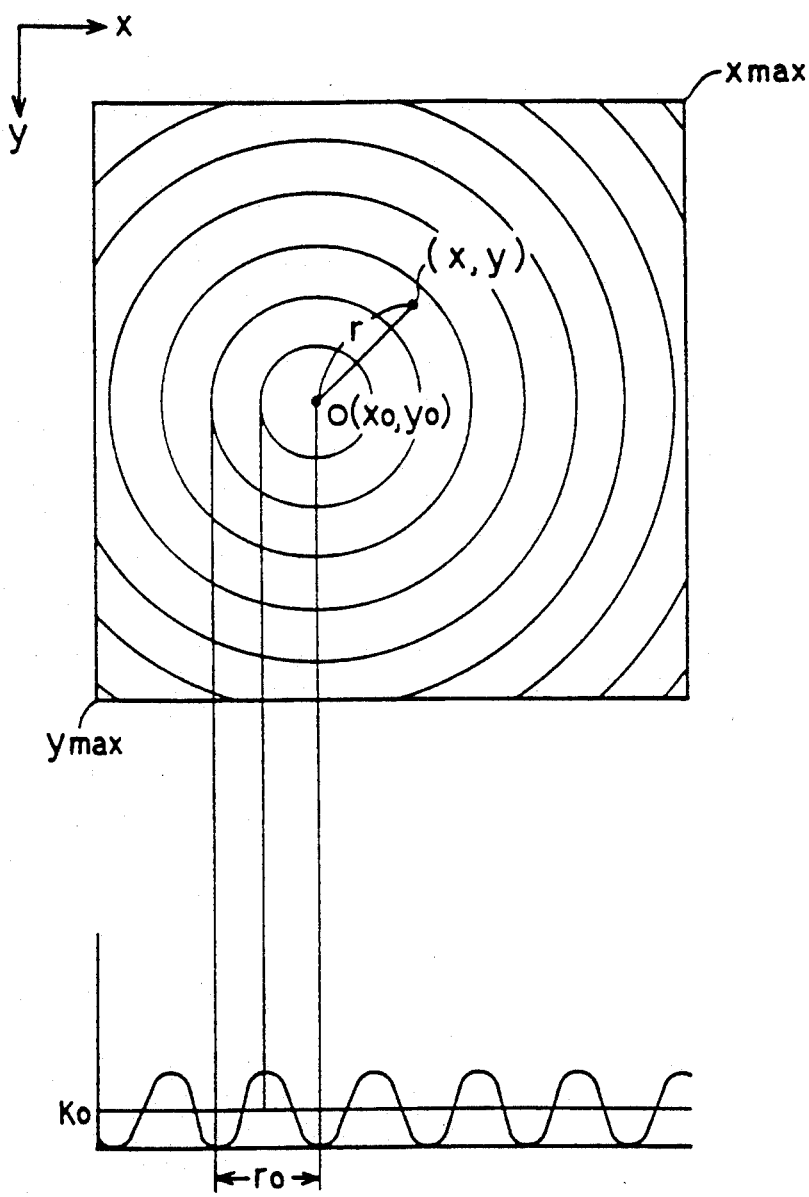
FIG. 5 is an explanatory view illustrating dot generation by applying a software.

For example, when the desired halftone dots on an image form concentric circles in shape, as shown in FIG. 5, the threshold level F(x,y) representing the halftone dot shape is calculated from the following equation (1):

$$F(x,y) = k_0 (\sin(2\pi r/r_0) + 1) \tag{1}$$

where $k_0$ is a constant and $r_0$ is a distance corresponding to a cycle of the dot shape as shown in the lower part of FIG. 5. A variable r is determined from the values of x and y as follows:

$$r=[(x-x_0)^2+(y-y_0)^2]^{0.5} \quad (2)$$

where $x_0$ and $y_0$ are coordinates of the center of the concentric circles.

When the halftone dot information input at step 100 includes a functional equation expressing a shape of halftone dots, the threshold level $F(x,y)$ is determined from the functional equation, which is stored in the RAM 17 at step 160.

At step 170, the multi-digital image data $A(x,y)$ input at step 150 is compared with the threshold level $F(x,y)$ calculated at step 160. When the image data $A(x,y)$ is equal to or greater than the threshold level $F(x,y)$, the procedure proceeds to step 180 at which data having a value of "1" is written in the binary frame memory 27 at a location defined by the values x and y. In other words, the value of the binary image data $B(x,y)$ is set at one. On the other hand, when $A(x,y)$ is less than $F(x,y)$ at step 170, the procedure proceeds to step 190 at which the value of the binary image data $B(x,y)$ is set at zero.

Step 180 and step 190 are followed by step 200, at which it is judged whether the variable y has reached to its maximum value ymax. When the variable y is less than ymax, the program returns to step 140 and repeats the processing from step 140 to step 200. When the variable y is equal to or greater than ymax at step 200, the processing proceeds to step 210 at which it is judged whether the variable x has reached to its maximum value xmax. When the variable x is less than xmax, the processing returns to step 124 and the variable y is initialized again. Steps 130 through 210 are then repeated for the next scanning line.

When the variable x is equal to or greater than xmax at step 210, the processing exits the routine.

As described above, in this embodiment, the hardware dot generator 25 forms halftone dots having ordinary shapes, e.g., squares, rounds, chains, or bricks, frequently used in ordinary reproduction or printing; thus, high-speed dot formation is accomplished by the hardware dot generator. On the other hand, the software dot formation by the CPU 13 forms halftone dots having complicated shapes, e.g., grains or concentric circles. The software dot formation has another advantage of forming different types of halftone dots in one page, such as those having different shapes, different screen rulings, or different screen angles. Thus, the software dot formation provides more flexibility in forming various halftone dots than the hardware dot formation.

In the above embodiment, the multi-digital image data supplying unit M1 shown in FIG. 1 corresponds to the multi-digital frame memory 23, and the hardware dot generating unit M2 corresponds to the hardware dot generator 25. Further, the software dot generating unit M3 corresponds to the dot formation processing executed by the CPU 13, and the selector unit M4 corresponds to step 110 shown in FIG. 4.

Although multi-digital image data are temporarily stored in the multi-digital frame memory 23 and then processed in the above embodiment, image data supplied from the terminal processors 1 can be developed into raster data by the CPU 13 and directly converted into binary halftone-dot image data. That is, the multi-digital image data developed into raster data by the CPU 13 can be directly supplied to the hardware dot generator 25 or directly processed according to the dot formation program carried out by the CPU 13.

Figure 6:
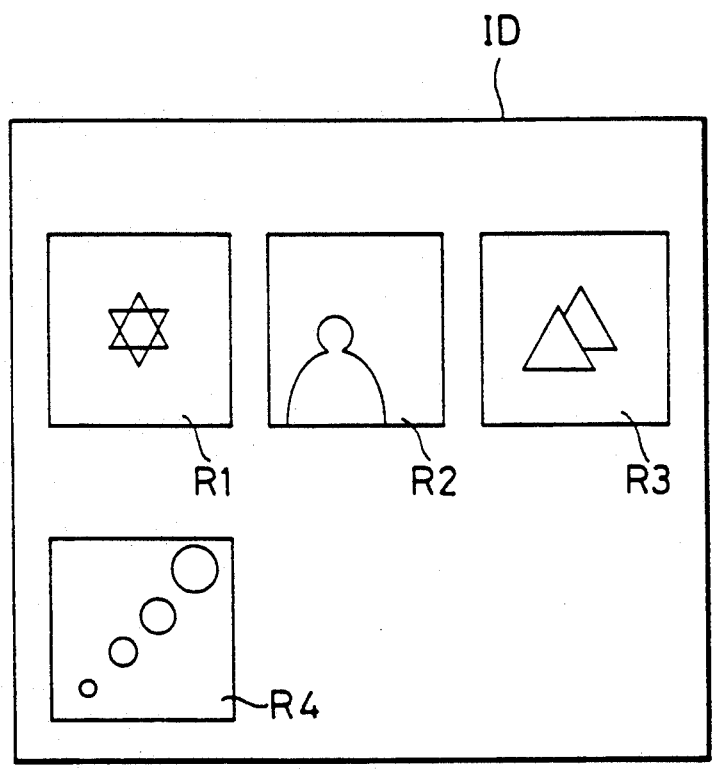
FIG. 6 is an explanatory view illustrating image regions in an one-page-image.

In a one-page image to be recorded by a recording scanner 29, some part of the image may be processed by the hardware dot formation and the other part by applying the software dot formation. FIG. 6 illustrates a one-page image including plural image regions. Each of the plural image regions R1, R2, R3, and R4 can be processed by one of the hardware and the software dot formation. Further, the image regions can be processed with respective types of halftone dots, such as those having different shapes, different screen rulings, and different screen angles. In these cases, the steps from 100 through 210 shown in FIG. 4 are performed for each image region.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for forming a halftone image from a contone image comprising:

multi-digital image data supplying means for supplying multi-digital image data representing said contone image;

hardware dot generating means having an electronic circuit including a comparator and a first pattern memory for producing binary image data in response to a level of said multi-digital image data, said first pattern memory storing first basic pattern data consisting of a plurality of threshold levels, said hardware dot generating means performing said producing by comparing said first basic pattern data with said multi-digital image data with said comparator for each pixel;

software dot generating means having an electronic circuit including a second pattern memory, a program memory and a processor, for producing binary image data in response to a level of said multi-digital image data, said second pattern memory storing second basic pattern data consisting of function data, said program memory storing program for calculating binary image data on the basis of multi-digital image data and said function data, said processor executing said program to produce binary image data; and selection means for selecting one of said hardware dot generating means and said software dot generating means, and activating the selected means.

2. An apparatus in accordance with claim 1, wherein said first pattern memory is a read only memory, and said second pattern memory is a random access memory.

3. An apparatus in accordance with claim 2 further comprising:

data input means for inputting a halftone-dot type data indicating a type of half-tone dots; and wherein said selection means comprising:

judging means for judging whether said halftone-dot type data corresponds to said first basic pattern data or said second basic pattern data; and selective activation means for activating said hardware dot generating means when said halftone-dot type data corresponds to said first basic pattern data and activating said software dot generating means when said halftone-dot type data corresponds to said second basic pattern data.

4. An apparatus in accordance with claim 3, wherein said first and second pattern memories store plural sets of first pattern data and plural sets of second pattern data, respectively; and one of said hardware and software dot generating means activated by said selective activation means performs said producing binary image data on the basis of a designated pattern data in said first and second pattern memories designated by said halftone-dot type data.

5. An apparatus in accordance with claim 4 further comprising:

image region specifying means for specifying plural image regions in said contone image; and wherein said selective activation means activates one of said hardware and software dot generating means for each of said plural image regions according to said halftone-dot type data assigned to each of said plural image regions.

6. An apparatus in accordance with claim 5 further comprising:

image editing means for editing said contone image including a character, a graphic, and a picture element, producing said multi-digital image data representing said contone image, and supplying said multi-digital image data to said multi-digital image data supplying means; and recording means for recording a halftone dot image on the basis of said binary image data generated by one of said hardware dot generating means and said software dot generating means.

7. An apparatus in accordance with claim 6, wherein said multi-digital image data includes a page description language expressing locations, directions, and sizes of said character, graphic, and picture element in said contone image.

8. An apparatus in accordance with claim 7, wherein said multi-digital image data supplying means includes a multi-digital frame memory.

9. A method of forming a halftone image from a contone image comprising the steps of:

(a) preparing multi-digital image data representing said contone image for each pixel;

(b) preparing a hardware dot generator having an electronic circuit including a comparator and a first pattern memory for storing a first basic pattern data consisting of a plurality of threshold levels, and a software dot generator having an electronic circuit including a program memory, a processor and a second pattern memory for storing a second pattern data consisting of function data;

(c) selecting one of said hardware dot generator and software dot generator; and (d) activating the selected generator, whereby said hardware dot generator compares said first basic pattern data with said multi-digital image data with said comparator for each pixel to produce binary image data when said hardware dot generator is selected, and said software dot generator calculates binary image data on the basis of multi-digital image data and said second pattern data with said processor according to a program stored in said program memory when said software dot generator is selected.

10. A method in accordance with claim 9, wherein said first pattern memory is a read only memory, and said second pattern memory is a random access memory.

11. A method in accordance with claim 10 comprising prior to said step (d) a step of:

inputting a halftone-dot type data indicating a type of halftone-dots; and wherein said step (d) comprising the steps of:

(d-1) judging whether said halftone-dot type data corresponds to said first basic pattern data or said second basic pattern data; and (d-2) activating said hardware dot generator when said halftone-dot type data corresponds to said first basic pattern data and activating said software dot generator when said halftone-dot type data corresponds to said second basic pattern data.

12. A method in accordance with claim 11, wherein said first and second pattern data includes plural sets of first pattern data and plural sets of second pattern data, respectively; and at said step (d), an activated dot generator produces said binary image data on the basis of a designated pattern data in said first and second pattern data designated by said halftone-dot type data.

13. A method in accordance with claim 12 comprising between said steps (b) and (c) a step of:

specifying plural image regions in said contone image; and wherein at said step (d), one of said hardware and software dot generators is activated for each of said plural image regions according to said halftone-dot type data assigned to each of said plural image regions.

14. A method in accordance with claim 13, wherein said step (a) comprising a step of editing said contone image including a character, a graphic, and a picture element to produce said multi-digital image data; and said method further comprising a step of recording a halftone dot image on the basis of said binary image data generated by one of said hardware dot generator and said software dot generator.

15. A method in accordance with claim 14, wherein said multi-digital image data includes a page description language expressing locations, directions, and sizes of said character, graphic, and picture element in said contone image.

* * * * *